May 27, 1924.  F. EDHOLM  1,495,259
BALL BEARING
Filed Aug. 13, 1921
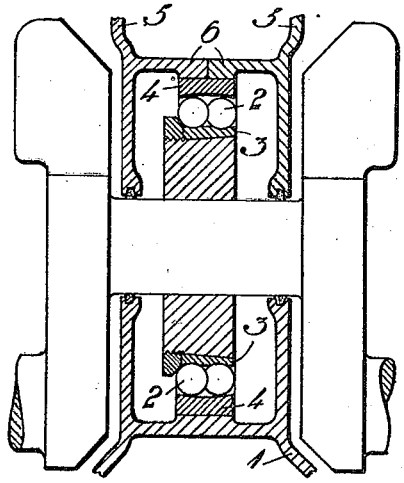
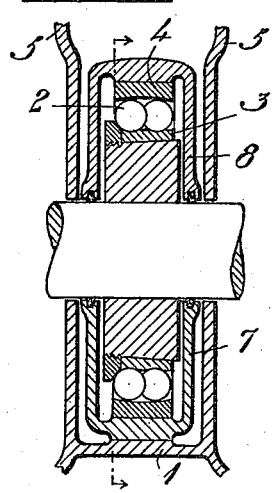
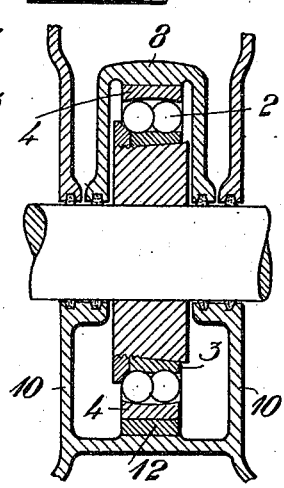
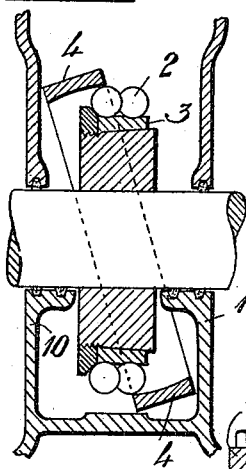
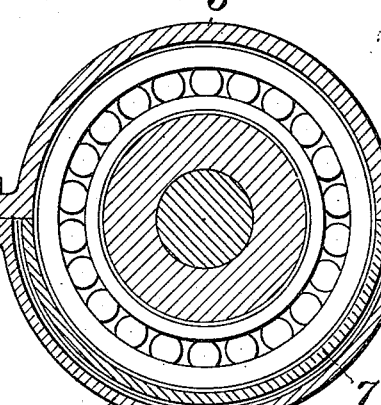
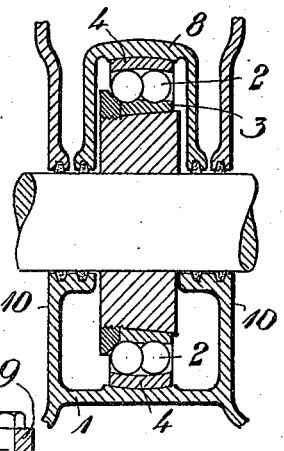
Inventor
F. Edholm,
By Marks & Clerk
Attys.

Patented May 27, 1924.

1,495,259

UNITED STATES PATENT OFFICE.

FREDRIC EDHOLM, OF ESKILSTUNA, SWEDEN, ASSIGNOR TO MUNKTELLS MEKANISKA VERKSTADS AKTIEBOLAG, OF ESKILSTUNA, SWEDEN.

BALL BEARING.

Application filed August 13, 1921. Serial No. 492,054.

*To all whom it may concern:*

Be it known that I, FREDRIC EDHOLM, subject of the King of Sweden, residing at 20, Strandgatan, Eskilstuna, Sweden, have invented certain new and useful Improvements in Ball Bearings of which the following is a specification.

When mounting ball-bearings into machines of various types, it is important that the arrangement is such as to render the bearings accessible for inspection and, if required, for the renewal of balls.

It is, of course, also of the utmost importance that such inspection and renewal of balls can be effected conveniently and with as little loss of time as possible. This requirement is, in fact, generally met with in free bearing chambers. Some built-in constructions, however, must be made so that the axial extension of the bearing will be the smallest possible, and, further so, that the bearing chamber will be disposed between two vertical walls of a larger casing or the like, such, for instance, as in the intermediate bearing of an internal combustion engine. These constructions, as heretofore made, have the disadvantage of necessitating the dismantling of the whole machine in order to render the bearing accessible, such dismantling obviously being a tedious and laborious task.

In the accompanying drawing Fig. 1 shows the constructive arrangement of a bearing, such as is commonly used.

1 designates the bottom plate, 2 the balls, 3 the inner ball race, 4 the outer ball race and 5 the two crank cases situated at a short distance from each other and holding between them the bearing, the outer ball race of which bears against the flanges 6 of the crank cases with the top portion thereof, while the lower portion of this ball race bears against the bottom plate 1.

This arrangement of bearing is certainly simple and inexpensive, but the ball races and the balls are not accessible before the crank cases have been removed and the shaft is raised.

In many other instances, it is difficult to inspect the ball bearings. For example, there are entirely free bearings in which the lower portion of the ball-bearing chamber is difficult to remove without dislocating the whole shafting.

Now, the present invention has for its object to provide an arrangement by which the above-mentioned drawbacks are eliminated.

The invention specially refers to bearings, the outer ball race of which has a spherical inner surface, and the invention is principally distinguished by the lower portion of the bearing chamber comprising two parts, one of which is arranged and shaped so as to permit of its being rotated around the bearing and of thus being detached upon removal of the top portion of the bearing chamber, so that the outer ball race may be tilted out of its normal position, whereby the balls are rendered accessible for inspection and renewal.

The arrangement above described can be modified in that the part of the lower portion of the bearing chamber which is detachable upon removal of the cap or binder may be omitted, the outer ball race being instead spherical also on the outside, so that it may be swung out of its normal position immediately after the cap or binder has been removed.

In the accompanying drawings, Figs. 2-6 represent three embodiments of the invention. Figs. 2 and 3 show the first embodiment in longitudinal and cross sections respectively. Fig. 4 shows the second embodiment in longitudinal section, and Fig. 5 shows the second embodiment upon removal of the cap and the detachably inserted part and after the outer ball race has been swung out of its operative position. Fig. 6 shows the third embodiment in longitudinal section.

The embodiments shown are all applications of the invention in intermediate bearings of internal combustion engines.

In all of these figures, the reference numerals are the same as in Fig. 1. Thus, 1 denotes the bottom plate, 2 the balls, 3 the inner ball race, 4 the outer ball race and 5 the crank cases.

According to Figs. 2 and 3, the whole bearing proper, that is to say the ball and the ball races, are enclosed by a special bearing chamber which is generally composed of two halves, the lower one of said halves being denoted by 7 and the upper one by 8. These halves encircle the shaft and bear against the latter through the medium of packings, and the cylindrical inner surfaces of the peripheral portions of said halves form a bearing surface for the outer ball race.

The cylindrical outer side of the peripheral portion of the lower half bears against a correspondingly shaped surface of the bottom plate. The two parts 7 and 8 of the bearing chamber are of the same shape and size excepting that the upper part 8 is provided with lugs 9 having screws extending therethrough by means of which the upper part is attached to the bottom plate 1. It is understood, and clearly represented in Fig. 3, that this attaching means also serves to retain the lower part in its position. However, after the upper part has been unscrewed and removed, the lower part 7 can be rotated about the axis of the shaft and around the outer ball race, into the position normally occupied by the upper part 8 and then removed. During the rotary movement, the member 7 will slide along the bottom 1. The outer ball race may then be swung out of its operative position, as represented in Fig. 5, whereby the balls are rendered accessible so as to permit of ready inspection and renewal thereof.

According to the embodiment shown in Fig. 4, the lower half of the outer ball race also bears against a detachably inserted part between the same and the bottom plate, but in this case the detachable part is not formed as a lower part of a bearing chamber that is to say, it is not provided with flanges encircling the shaft but is shaped as a semicircular ring 12. The two lower walls 10 of the crank case are instead shaped so as to form a chamber for the lower portion of the bearing, whereas the upper portion 8 of the bearing chamber is formed in the same manner as in the previously-described embodiment of the invention. Consequently, a central cross section of the embodiment according to Fig. 4 will be similar to a corresponding cross section of the previously-described embodiment.

According to the embodiment shown in Fig. 6, the detachably inserted part, serving as an external support for the lower half of the outer ball race, is entirely omitted, the outer ball race being instead spherical also on the outside thereof, and bearing against correspondingly shaped surfaces in the bottom plate 1 and the cap 8.

By the latter arrangement, the same result is also attained, in that the outer ball race may be swung, on removal of the cap, into an oblique position, that is to say out of the operative position, so that the balls are rendered accessible.

What I claim as new and desire to secure by Letters Patent of the United States is:—

1. In an antifrictional bearing, an outer race ring, a casing surrounding said race ring, the top portion and the lower portion of said casing being made of different parts, and the lower portion of the casing consisting at the circumference of two parts, the inner part of the lower portion of the casing being capable of rotation to an upper position to permit removal of the same when the top portion of the casing has been removed, and the outer race ring being capable of tilting out of its normal position when the top portion and the inner part of the lower portion of the casing have been removed.

2. In an antifrictional bearing, an outer race ring, a casing surrounding the top portion of the bearing, a casing surrounding the lower portion of the bearing, two walls located respectively at each side and near said top casing, axially mounted, and the outer race ring being capable of tilting out of its normal position, when the said top casing has been removed.

3. In an antifrictional bearing, an outer race ring, having an inside so shaped that it does not prevent a tilting of the race, a casing surrounding said race ring, the top portion and the lower portion of said casing being made of different parts, the lower portion consisting at the circumference of two parts surrounding each other, the inner one of said parts being loosely inserted between the outer race ring and the part of the lower portion of the casing, so that upon removal of the upper portion of the casing said inner part of the lower portion of the casing can be brought to an upper position by rotating the outer race ring.

4. In an antifrictional bearing, an outer race ring, a casing surrounding said race ring, the top portion and the lower portion of said casing being made of different parts, and the lower portion of the casing consisting at the circumference of two parts, the inner part of the lower portion of the casing being capable of rotation to an upper position to permit removal of the same when the top portion of the casing has been removed, and the outer race ring being capable of tilting out of its normal position when the top portion and the inner part of the lower portion of the casing have been removed, the top portion of the casing being detachably connected to the outer part of the lower portion of the casing.

5. In an antifrictional bearing, an outer race ring, a casing surrounding said race ring, the top portion and the lower portion of said casing being made of different parts, and the lower portion of the casing consisting at the circumference of two parts, the inner part of the lower portion of the casing being capable of rotation to an upper position to permit removal of the same when the top portion of the casing has been removed, and the outer race ring being capable of tilting out of its normal position when the top portion and the inner part of the lower portion of the casing have been removed, and two walls located respectively at each side of and near the top portion of the casing.

In testimony whereof I affix my signature in presence of two witnesses.

FREDRIC EDHOLM.

Witnesses:
P. H. BERGROLH,
S. SWENSON.